Patented Sept. 12, 1972

3,691,064
HYDROCARBON CONVERSION WITH A MULTICOMPONENT CATALYST

John C. Hayes, Palatine, and Ernest L. Pollitzer, Skokie, Ill., assignors to Universal Oil Products Company, Des Plaines, Ill.
No Drawing. Original application Apr. 24, 1968, Ser. No. 723,895. Divided and this application July 31, 1970, Ser. No. 60,156
Int. Cl. C10g 35/08
U.S. Cl. 208—136    16 Claims

ABSTRACT OF THE DISCLOSURE

Hydrocarbons are converted by contacting them and hydrogen, at hydrocarbon conversion conditions, with a catalytic composite comprising a combination of a platinum group component, a rhenium component, a group VI transition metal component and a halogen component with an alumina carrier material in amounts sufficient to result in the composite containing, on an elemental basis, about 0.05 to about 1 wt. percent of the platinum group metal, about 0.05 to about 1 wt. percent rhenium, about 0.01 to about 1 wt. percent of the group VI transition metal component and about 0.1 to about 1.5 wt. percent of halogen. A specific example of the disclosed process involves the catalytic reforming of a gasoline fraction with this catalytic composite.

CROSS-REFERENCES TO RELATED APPLICATIONS

This application is a division of our prior and now abandoned application entitled "Hydrocarbon Conversion Catalyst and Process" filed Apr. 24, 1968, and assigned Ser. No. 723,895.

DISCLOSURE

The subject of the present invention is the use of a novel catalytic composite which has an exceptional activity and resistance to deactivation when employed in hydrocarbon conversion processes that require a catalyst having a hydrogenation-dehydrogenation function coupled with a cracking function. More particularly, the present invention relates to an improved reforming process which utilizes a novel catalytic composite containing a platinum group component, a rhenium component, and a group VI transition metal component combined with an alumina carrier material.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this latter type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst utilized exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time and presence of diluents such as $H_2$; (2) selectivity refers to the amount of the reactants that are converted into the desired product and/or products; (3) stability refers to the rate of change with time of the acivity and selectivity parameters—obviously the smaller rate implying the more stable catalyst. In a reforming process, for example, activity commonly refers to the amount of conversion that takes place for a given charge stock at a specified severity level and is typically measured by octane number of the $C_5^+$ product stream; selectivity refers to the amount of $C_5^+$ yield relative to the amount of the charge stock that is obtained at the particular severity level; and stability is typically equated to the rate of change with time of activity, as measured by octane number of $C_5^+$ product, and of selectivity, as measured by $C_5^+$ yield. Actually, the last statement is not strictly correct because generally a continuous reforming process is run to produce a constant octane $C_5^+$ product with a severity level being continuously adjusted to attain this result. Furthermore, the severity level for this process is usually varied by adjusting the conversion temperature in the reaction zone so that, in point of fact, the rate of change of activity finds response in the rate of change of conversion temperature, and changes in this last parameter are customarily taken as indicative of activity stability.

As is well-known to those skilled in the art, the principal cause of observed deactivation or instability of these dual-function catalysts when they are used in a hydrocarbon conversion reaction is associated with the fact that coke forms on the surface of the catalyst during the course of the reaction. More specifically, in the hydrocarbon conversion processes, the conditions utilized typically result in the formation of heavy, high molecular weight, black solid, or semi-solid, carbonaceous material which coats the surface of the catalyst reducing its activity by shielding its active sites from the reactants. In other words, the performance of this dual-function catalyst is sensitive to the presence of carbonaceous deposits on the surface of the catalyst. Accordingly, the major problem facing workers in this area of the art is the development of a more active and selective catalytic composite that is not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability characteristics. In particular, for a reforming process the problem is typically expressed in terms of shifting and stabilizing the $C_5^+$ yield-octane relationship—$C_5^+$ yield being representative of the selectivity, and octane being proportional to activity.

We have now found a dual-function catalytic composite which possesses improved activity, selectivity, and stability characteristics when it is employed in a process for the conversion of hydrocarbons of the type which have heretofore utilized dual-function catalytic composites, such as processes for isomerization, hydroisomerization, dehydrogenation, hydrogenation, alkylation, dealkylation, cyclization, dehydrocyclization, cracking, hydrocracking, reforming, and the like processes. In particular, we have determined that a catalyst, comprising a combination of a platinum group component, a rhenium component, and a group VI transition metal component with an alumina carrier material, enables the performance of hydrocarbon conversion processes utilizing dual-function catalysts to be substantially improved. Moreover, in the particular case of a reforming process, we have observed that this novel catalyst allows the stability of the process to be markedly improved.

It is, accordingly, one object of the present invention to provide a hydrocarbon conversion catalyst having superior performance characteristics when utilized in a hydrocarbon conversion process. A second object is to provide a catalyst having both a hydrogenation-dehydrogenation function and an acid function and having performance characteristics which are relatively insensitive to the deposition of hydrocarbonaceous material thereon. A third object is to provide a method of preparation and a method of utilization of this catalytic composite which insures the achievement and maintenance of its superior properties.

In one embodiment, the present invention relates to the use of the conversion of hydrocarbons of a catalytic composite comprising a combination of a platinum group component, a group VI transition metal component, a rhenium component and a halogen component with an alumina carrier material. These components are present in the composite in amounts sufficient to result in a final catalytic composite containing, on an elemental basis, about 0.01 to about 1 wt. percent group VI transition metal, about 0.05 to about 1 wt. percent platinum group metal, about 0.05 to about 1 wt. percent rhenium and about 0.1 to about 1.5 wt. percent halogen.

Yet another embodiment relates to a process for reforming a gasoline fraction which comprises contacting the gasoline fraction and hydrogen with the catalyst described in the first embodiment at reforming conditions sufficient to produce a high octane reformate.

Other objects and embodiments of the present invention relate to the specific details regarding essential and preferred catalytic ingredients, preferred amounts of the various components, suitable methods of catalyst preparation, operating conditions for use in the hydrocarbon conversion processes, and the like particulars. These are hereinafter disclosed in the following detailed discussion of each of these facets of the present invention.

As indicated above, the catalyst of the present invention comprises an alumina carrier material having combined therewith a platinum group component, a rhenium component, a group VI transition metal component and a halogen component. Considering first the alumina utilized in the present invention, it is preferred that the alumina material be a porous, adsorptive, high surface area support having a surface area of about 25 to about 500 or more $m.^2/gm$. Suitable alumina materials are the crystalline aluminas known as gamma-, eta-, and theta-alumina, with gamma-alumina giving best results. In addition, in some embodiments, the alumina support may contain minor proportions of other well-known refractory inorganic oxides such as silica, zirconia, magnesia, etc. However, the preferred support is substantially pure gamma-alumina. In fact, an especially preferred support has an apparent bulk density of about 0.3 g./cc. to about 0.7 g./cc. and surface area characteristics such that the average pore diameter is about 20 to about 300 angstroms, the pore volume of about 0.1 to about 1 ml./g., and the surface area is about 100 to about 500 $m.^2/g$.

The alumina carrier may be prepared in any suitable manner and may be synthetically prepared or natural occurring. Whatever type of alumina is employed it may be activated prior to use by one or more treatments including drying, calcination, steam, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc. in an amount to form an aluminum hydroxide gel which upon drying and calcining is converted to alumina. The alumina carrier material may be formed in any desired shape such as spheres, pills, cakes, extrudates, powders, granules, etc. For the purpose of the present invention a particularly preferred form of alumina in the sphere; and alumina spheres may be continuously manufactured by the well-known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See U.S. Pat. No. 2,620,314 for additional details regarding this oil drop method.

As indicated above, one essential ingredient of the catalyst of the present invention is a platinum group component. Although the process of the present invention is specifically directed to the use of a catalytic composite containing platinum, it is intended to include other platinum group metals such as palladium, rhodium, ruthenium, etc. The platinum group component, such as platinum, may exist within the final catalytic composite as a compound such as an oxide, sulfide, halide, etc., or in an elemental state. Generally the amount of the platinum group component present in the final catalyst is small compared to the quantities of the other components combined therewith. In fact, the platinum group component preferably comprises about 0.05 to about 1 by weight of the final catalytic composite, calculated on an elemental basis. Excellent results are obtained when the catalyst contains about 0.3 to about 0.9 weight percent of the platinum group metal.

The platinum group component may be incorporated in the catalytic composite in any suitable manner such as coprecipitation or cogellation with the alumina carrier material, ion-exchange with the alumina carrier material and/or alumina hydrogel, or impregnation either after during or before calcination of the alumina hydrogel, etc. The preferred method of preparing the catalyst involves the utilization of water-soluble compounds of the platinum group metals with which the carrier is combined by an impregnation technique. Thus, the platinum group metal may be added to the carrier by commingling the latter with an aqueous solution of chloroplatinic acid. Other water-soluble compounds of platinum group metals may be employed as impregnation solutions and include ammonium chloroplatinate, platinum chloride, dinitrodiamino platinum, etc. The utilization of a platinum group metal chloride compound, such as chloroplatinic acid, is preferred since it facilitates the incorporation of both the platinum group component and at least a minor quantity of a halogen component in a single step. Hydrogen chloride is also generally added to the impregnation solution in order to further facilitate the incorporation of the halogen component. In addition, it is generally preferred to impregnate the carrier after it has been calcined in order to minimize the risk of washing away the valuable platinum group metal compounds; however, in some cases it may be advantageous to impregnate the carrier when it is in a gelled state. Following the impregnation, the resulting impregnated carrier is typically dried and subjected to a high temperature calcination or oxidation technique which is essentially equivalent to the one hereinabove set forth in conjunction with the description of the preparation of the alumina carrier material.

A second essential constituent of the catalyst is the Group VI transitional metal component. Included within the scope of this expression are the metal and compounds of chromium, molybdenum and tungsten, with tungsten and compounds of tungsten being especially preferred. This component may exist within the final catalytic composite as a compound such as the oxide, sulfide, halide, etc., or in an elemental state. Regardless of the exact chemical or physical nature of the forces binding this component to the final composite, it is preferred that the final composite contain about 0.01 to about 1 wt. percent of this component, calculated on an elemental basis. A particularly preferred catalyst for example, would contain, on an elemental basis, about 0.5 wt. percent tungsten. The function performed by this component is not entirely understood; however, we believe its prime influence is in the area of promoting and stabilizing the hydrocracking function.

This Group VI component may be incorporated in the final composite in any suitable manner and at any stage in the preparation thereof. One method involves impregnation of the alumina carrier material with a suitable solution of the Group VI transition metal at any stage in the preparation of the alumina carrier material—that is, either as a hydrogel or after its calcination. Another method is the ion-exchange method in which a solution of a suitable compound of the Group VI metal, wherein the metal is present as an exchangeable ion, is contacted with the alumina hydrogel. Still another method involves cogellation or coprecipitation of the Group VI component with the alumina hydrogel. The preferred method involves impregnation of the calcined alumina carrier material with a solution containing the Group VI transition metal; for example, excellent results are obtained by impregnating with ammonium tungstate or tungsten tri or tetra chloride, followed by conventional drying and calcination steps.

A third essential ingredient of the catalyst of the present invention is the rhenium component. This component may be present as an elemental metal, as a chemical compound, such as the oxide, sulfide, halide, or in a physical or chemical association with the alumina carrier material and/or the other components of the catalyst. Preferably, the rhenium component is utilized in an amount sufficient to result in a final catalytic composite containing about 0.05 to about 1 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the alumina carrier material. The impregnation solution can in some cases be an aqueous solution of a suitable rhenium salt such as ammonium perrhenate, sodium perrhenate, potassium perrhenate and the like salts. In addition, aqueous solution of rhenium halides such as the chloride may be used; however, the preferred impregnation solution is an aqueous solution of perrhenate acid. In general, the rhenium component can be impregnated either prior to, simultaneously with, or after the other components are combined with the alumina carrier material. However, we have found that best results are achieved when the rhenium component is impregnated simultaneously with the other metallic components. In fact, we have determined that a preferred impregnation solution contains chloroplatinic acid, perrhenate acid, tungsten chloride, and hydrochloric acid.

It is preferred that the catalyst also contain a halogen component. Although the precise form of the chemistry of the association of the halogen component with the alumina carrier material is not entirely known, it is customary in the art to refer to the halogen component as being combined with the alumina carrier, or with the other ingredients of the catalyst. This combined halogen may be either fluorine, chlorine, iodine, bromine, or mixtures thereof. Of these, fluorine and, particularly, chlorine are preferred for the purposes of the present invention. The halogen may be added to the alumina carrier material in any suitable manner, either during preparation of the support or before, during, or after the addition of the metallic components. For example, the halogen may be added, at any stage of the preparation of the carrier or to the calcined carrier, as an aqueous solution of an acid such as hydrogen fluoride, hydrogen chloride, hydrogen bromide, etc. The halogen component, or a portion thereof, may be composited with alumina during the impregnation of the latter with the platinum group component or other metallic components; for example, through the utilization of a mixture of chloroplatinic acid and hydrogen chloride. In another situation, the alumina hydrosol which is typically utilized to form the alumina carrier material, may contain halogen and thus contribute at least a portion of the halogen component to the final composite. In any event, the halogen will be typically combined with the alumina carrier material in such a manner as to result in a final composite that contains about 0.1% to about 1.5% and preferably about 0.4 to about 0.9% by weight of halogen, calculated on an elemental basis.

In accordance with the above discussion, a particularly preferred catalyst for use in the present invention comprises a gamma-alumina carrier material having combined therewith about 0.05 to about 1 wt. percent platinum, about 0.01 to about 1 wt. percent of tungsten, about 0.05 to about 1 wt. percent rhenium, and about 0.1 to about 1.5 wt. percent of chlorine.

Regardless of the details of how the components of the catalyst are combined with the alumina carrier material, the resulting catalyst generally is dried at a temperature of about 200° F. to about 600° F. for a period of from about 2 to 24 hours or more and finally calcined at a temperature of about 700° F. to about 1100° F. for a period of about 0.5 to 10 hours, and preferably about 1 to about 5 hours.

It is preferred that the resulting calcined catalytic composite be subjected to a substantially water-free reduction prior to its use in the conversion of hydrocarbons. This step is designed to insure a uniform and finely divided dispersion of the metallic components throughout the alumina carrier material. Preferably, substantially pure and dry hydrogen (i.e. less than 5 vol. p.p.m. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce the metallic components to their elemental state. This reduction treatment may be performed in situ as part of a start-up sequence if precautions are taken to predry the plant to a substantially water-free state and if substantially water-free hydrogen is used.

Although it is not essential, the resulting reduced catalytic composite may, in some cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more.

According to the present invention, a hydrocarbon charge stock and hydrogen are contacted with a catalyst of the type described above in a hydrocarbon conversion zone at hydrocarbon conversion conditions. This contacting may be accomplished by using the catalyst in a fixed bed system, a fluidized bed system, or in a batch type operation; however, in view of the danger of attrition losses of the valuable catalyst and of well-known operational advantages, if is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case in which the catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_6$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods to remove substantially all sulfurous, nitrogenous and water-yielding contaminants therefrom.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane rich stock, or a n-hexane-rich stock, etc. In hydrocracking embodiments, the charge stock will be typically a gas oil, heavy cracked cycle oil, etc. In addition alkyl aromatic can be conveniently isomerized by using the catalyst of the present invention. Likewise pure hydrocarbon or substantially pure hydrocarbons can be converted to more valuable products by using the catalyst of the present invention in any of the hydrocarbon conversion processes, known to the art, that use a dual-function catalyst.

In a reforming embodiment, an effluent stream is withdrawn from the reforming zone containing the instant catalyst and passed through a condensing means to a separation zone, typically maintained at about 50° F., wherein a hydrogen-rich gas is separated from a high octane liquid product. Preferably, at least a portion of this hydrogen-rich gas is withdrawn from the separating zone and recycled through suitable compressing means back to the reforming zone. The liquid phase from the separating zone is then typically withdrawn and commonly treated in a fractionating system in order to adjust its butane concentration in order to control front-end volatility of the resulting reformate.

The conditions utilized in the numerous hydrocarbon conversion embodiments of the present invention are those customarily used in the art for the particular reaction, or combination of reactions, that is to be effected. For instance, alkylaromatic isomerization conditions include: a temperature of about 32° F. to about 1000° F.; a pressure at atmospheric to about 1500 p.s.i.g.; hydrogen to hydrocarbon mole ratio of about 0.5:1 to about 20:1, and a LHSV (calculated on the basis of equivalent liquid volume of the charge stock contacted with the catalyst per hour divided by the volume of the catalyst bed) of about 0.5 hr.$^{-1}$ to 20 hr.$^{-1}$. Likewise, typical hydrocracking conditions include: a pressure of about 500 p.s.i.g. to about 3000 p.s.i.g.; a temperature of about 400° F. to about 900° F.; a LHSV of about 0.1 hr.$^{-1}$ to about 10 hr.$^{-1}$; and hydrogen circulation rates of 1000 to 10,000 s.c.f. per barrel of charge.

In the reforming embodiment of the present invention, the pressure utilized is selected in the range of about 50 p.s.i.g. to about 1000 p.s.i.g. with the preferred pressure being about 100 p.s.i.g. to about 600 p.s.i.g. In fact, it is a singular advantage of the present invention that it allows stable operation at lower pressures than have heretofore been successfully utilized in so-called "continuous" reforming systems (i.e. reforming for periods of about 15 to about 200 or more barrels of charge per pound of catalyst without regeneration. In other words, the catalyst of the present invention enables the operation of a continuous reforming system to be conducted at lower pressure (i.e. 100 to 350 p.s.i.g.) for about the same or better catalyst life before regeneration as has been heretofore realized with conventional catalysts at higher pressures (i.e. 400 to 600 p.s.i.g.). On the other hand, the stability feature of the present invention enables reforming operations conducted at pressures of 400 to 600 p.s.i.g. to achieve substantially increased catalyst life before regeneration.

Similarly, the temperature required for reforming is generally selected from the range of from about 800° F. to about 1100° F. and preferably, about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is an advantage of the present invention that the rate at which the temperature is increased in order to maintain a constant octane product, is substantially lower for the catalyst of the present invention than for a high quality reforming catalyst of the prior art. Moreover, for the catalyst of the present invention, the $C_5^+$ yield loss for a given temperature increase is substantially lower than for a high quality reforming catalyst of the prior art.

The reforming embodiment of the present invention also typically utilizes sufficient hydrogen to provide an amount of about 2 to about 20 moles of hydrogen per mole of hydrocarbon entering the reforming zone with excellent results being obtained when about 7 to about 10 moles of hydrogen are used per mole hydrocarbon. Likewise, the liquid hourly space velocity (LHSV) used in reforming is selected from the range of about 0.1 to about 10 hr.$^{-1}$ with a value in the range of about 1.0 to about 5 hr.$^{-1}$ being preferred. In fact, it is another advantage of the present invention, that for the same severity level, it allows operations to be conducted at higher LHSV than normally can be stably achieved in a continuous reforming process with a high quality reforming catalyst of the prior art. This unexpected property of the catalyst of the present invention is primarily a consequence of its unusual response to temperature variation. Ordinarily, for conventional reforming catalysts at a specified severity level, it is necessary to operate at low temperature and low LHSV because the response of the catalyst to higher temperature is greatly increased hydrocracking with attendant $C_5^+$ yield decline. However, the catalyst of the present invention does not respond to higher temperatures in the expected fashion and the amount of hydrocracking experienced at the same temperature is significantly lower with it relative to that experienced with conventional reforming catalyst. Accordingly, the catalyst of the present invention enables the achievement of a given severity level by operating at a higher temperature and a higher LHSV than heretofore has been possible in a continuous reforming process. This last advantage is of immense economic significance because it allows a continuous reforming process to operate at the same throughput level with less catalyst inventory than that heretofore used with conventional reforming catalysts at no sacrifice in catalyst life before regeneration.

The following working example is given to illustrate further the preparation of the catalytic composite of the present invention and the use thereof in the conversion of hydrocarbons. It is understood that this example is given for the sole purpose of illustration and is not to be considered to limit unduly the generally broad scope and spirit of the appended claims.

EXAMPLE

An alumina carrier material comprising 1/16 inch alumina spheres is prepared by: forming an aluminum hydroxyl chloride sol by dissolving alumina pellets in hydrochloric acid, adding hexamethylenetetramine to the sol; gelling the resulting solution by dropping into an oil bath to form particles of alumina hydrogel; aging and washing the resulting particles; and finally, drying and calcining the aged and washed particles. Additional details as to this method are given in the teachings of U.S. Pat. No. 2,620,314.

The resulting gamma-alumina particles are then contacted with an impregnation solution containing chloroplatinic acid, perrhenic acid, tungsten tetrachloride and hydrogen chloride in amounts sufficient to yield a final composite containing 0.6 wt. percent platinum, 0.2 wt. percent rhenium, 0.5 wt. percent tungsten, and 0.85 wt. percent combined chloride—all calculated on an elemental basis. The impregnated spheres are then dried at a temperature of 300° F. for about an hour and then oxidized at a temperature of about 975° F. for about 1 hour.

The resulting catalyst is then prereduced by contacting with a substantially water-free hydrogen stream for about 1 hour at a temperature of about 1020° F., a pressure slightly above atmospheric, and a gas hourly space velocity of about 700 hr.$^{-1}$.

A portion of the resulting reduced catalyst is then loaded into a scale model of a continuous fixed-bed reforming plant of conventional design. In this plant, a light Kuwait naphtha and hydrogen are continuously contacted with the catalyst at reforming conditions including: a LHSV of 1.0 hr.$^{-1}$, a pressure of 200 p.s.i.g., hydrogen to hydrocarbon mole ratio of 7:1, and a temperature sufficient to continuously produce a $C_5^+$ reformate of 96 F-1 clear.

The light Kuwait naphtha contains 18.0 vol. percent naphthenes, 76.0 vol. percent paraffins, and 6 vol. percent aromatics. In addition, it possesses an initial boiling point of about 180, a 50% boiling point of about 214° F., an end boiling point of about 304° F., and an API gravity of about 64.9 at 60° F. Moreover, the amounts of sulfur and water contained therein are less than 1 p.p.m. respectively.

The run is continued for a catalyst life of about 20 barrels of charge per pound of the catalyst utilized (b.p.p) and it found that the $C_5^+$ yield is declining at a rate of about −0.3 vol percent/b.p.p. and the average rate of temperature increase necessary to maintain octane at 96.0 F-1 clear is about 3.0° F./b.p.p. There results stand in contrast to the expected rates of about −1.2 vol percent/b.p.p. and about 6.0° F./b.p.p. for a high quality platinum-chloride-alumina catalyst of the prior art under the same conditions.

We claim as our invention:

1. A process for converting a hydrocarbon comprising contacting the hydrocarbon and hydrogen, at hydrocarbon conversion conditions, with a catalytic composite comprising a combination of a platinum group component, a rhenium component, a group VI transition metal component and a halogen component with an alumina carrier material in amounts sufficient to result in a composite containing, on an elemental basis, about 0.05 to about 1 wt. percent of the platinum group metal, about 0.05 to about 1 wt. percent of rhenium, about 0.01 to about 1 wt. percent of the group VI transition metal and about 0.1 to about 1.5 wt. percent of halogen.

2. A process as defined in claim 1 wherein said platinum group component of the composite is platinum or a compound of platinum.

3. A process as defined in claim 1 wherein said halogen component of the composite is chlorine or a compound of chlorine.

4. A process as defined in claim 1 wherein said group VI transition metal component of the composite is tungsten or a compound of tungsten.

5. A process as defined in claim 1 wherein said group VI transition metal component of the composite is chromium or a compound of chromium.

6. A process as defined in claim 1 wherein said group VI transition metal component of the composite is molybdenum or a compound of molybdenum.

7. A process as defined in claim 1 wherein said catalytic composite also contains a sulfur component in an amount sufficient to result in a final composite containing about 0.05 to about 0.5 wt. percent sulfur.

8. A process as defined in claim 1 wherein said alumina carrier material is gamma-alumina.

9. A process for reforming a gasoline fraction comprising contacting the gasoline fraction and hydrogen, at reforming conditions, with a catalytic composite comprising a combination of a platinum group component, a rhenium component, a group VI transition metal component and a halogen component with an alumina carrier material in amounts sufficient to result in a composite containing on an elemental basis, about 0.05 to about 1 wt. percent of the platinum group metal, about 0.05 to about 1 wt. percent of rhenium about 0.01 to about 1 wt. percent of the group VI transition metal and about 0.1 to about 1.5 wt. percent halogen.

10. A process as defined in claim 9 wherein said platinum group component of the composite is platinum or a compound of platinum.

11. A process as defined in claim 9 wherein said halogen component of the composite is chlorine or a compound of chlorine.

12. A process as defined in claim 9 wherein said group VI transition metal component of the composite is chromium or a compound of chromium.

13. A process as defined in claim 9 wherein said group VI transition metal component of the composite is molybdenum or a compound of molybdenum.

14. A process as defined in claim 9 wherein said group VI transition metal component of the composite is tungsten or a compound of tungsten.

15. A process as defined in claim 9 wherein said alumina carrier material is gamma-alumina.

16. A process as defined in claim 9 wherein the catalytic composite utilized also contains a sulfur component in an amount sufficient to result in the composite containing about 0.05 to about 0.5 wt. percent sulfur.

References Cited

UNITED STATES PATENTS

| | | | |
|---|---|---|---|
| 3,436,335 | 4/1969 | Maziuk | 208—139 |
| 3,415,737 | 12/1968 | Klyksdahl | 208—139 |

HERBERT LEVINE, Primary Examiner

U.S. Cl. X.R.

208—139; 252—466 PT